United States Patent
Cohen et al.

(10) Patent No.: US 10,811,159 B2
(45) Date of Patent: Oct. 20, 2020

(54) FUELING METHOD FOR SMALL, STEADY-STATE, ANEUTRONIC FRC FUSION REACTORS

(71) Applicant: THE TRUSTEES OF PRINCETON UNIVERSITY, Princeton, NJ (US)

(72) Inventors: Samuel A. Cohen, Princeton, NJ (US); Daren Stotler, Plainsboro, NJ (US); Michael Buttolph, Rumney, NH (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 1159 days.

(21) Appl. No.: 14/477,319

(22) Filed: Sep. 4, 2014

(65) Prior Publication Data

US 2015/0228369 A1    Aug. 13, 2015
US 2020/0005958 A9    Jan. 2, 2020

Related U.S. Application Data

(63) Continuation-in-part of application No. PCT/US2013/040520, filed on May 10, 2013, which
(Continued)

(51) Int. Cl.
*G21B 1/05* (2006.01)
*G21K 1/14* (2006.01)
(Continued)

(52) U.S. Cl.
CPC .............. *G21K 1/14* (2013.01); *G21B 1/052* (2013.01); *G21B 1/15* (2013.01); *H05H 1/02* (2013.01); *Y02E 30/122* (2013.01); *Y02E 30/16* (2013.01)

(58) Field of Classification Search
CPC .................................. G21B 1/00; G21B 1/052
See application file for complete search history.

(56) References Cited

U.S. PATENT DOCUMENTS 3,546,019 A   12/1970   Von Doehren et al.
4,234,925 A   11/1980   Kitano et al.
(Continued)

FOREIGN PATENT DOCUMENTS

WO   2013/191779 A2   12/2013
WO   2014/031190 A2    2/2014

OTHER PUBLICATIONS

Pajer, Gary, et al. "Modular Aneutronic Fusion Engine." Space Propulsion (May 2012). (Year: 2012).*
(Continued)

*Primary Examiner* — Lily C Garner
(74) *Attorney, Agent, or Firm* — Volpe Koenig

(57) ABSTRACT

A system and method for fueling a fusion reactor. The system includes a reactor chamber containing a stable plasma including a fusion fuel; a heating system configured to heat the plasma and increase an ion energy of the plasma to a level sufficient for producing net power from fusion reactions in the stable plasma; a plurality of magnets coaxial to the reactor chamber, the plurality of magnets producing a magnetic field sufficient to confine the stable plasma and promote rapid loss of fusion products into a scrape off layer; and a neutral beam injection system configured to inject additional quantities of the fusion fuel to sustain the power output of the fusion reaction.

20 Claims, 2 Drawing Sheets

Related U.S. Application Data is a continuation-in-part of application No. 14/466,425, filed on Aug. 22, 2014, now Pat. No. 10,229,756.

(60) Provisional application No. 61/873,651, filed on Sep. 4, 2013, provisional application No. 61/645,459, filed on May 10, 2012, provisional application No. 61/868,629, filed on Aug. 22, 2013.

(51) Int. Cl.
  G21B 1/15 (2006.01)
  H05H 1/02 (2006.01)

(56) References Cited

U.S. PATENT DOCUMENTS

| | | | |
|---|---|---|---|
| 4,244,782 A | 1/1981 | Dow | |
| 4,265,721 A | 5/1981 | Hackmyer | |
| 5,214,981 A | 6/1993 | Weinberger et al. | |
| 5,733,421 A | 3/1998 | Pettigrew et al. | |
| 6,155,212 A | 12/2000 | McAlister | |
| 6,611,106 B2 * | 8/2003 | Monkhorst | G21B 1/00 250/251 |
| 6,891,173 B2 * | 5/2005 | Gammel | H01J 37/08 250/251 |
| 7,613,271 B2 * | 11/2009 | Rostoker | G21B 1/052 315/111.21 |
| 2006/0198485 A1 | 9/2006 | Binderbauer | |
| 2011/0026657 A1 | 2/2011 | Laberge et al. | |
| 2012/0187906 A1 | 7/2012 | Martienssen et al. | |

OTHER PUBLICATIONS

Ehlers, K. W., et al. Conceptual design of a neutral-beam injection system for the TFTR. No. LBL-4425; CONF-751125--86. California Univ., Berkeley (USA). Lawrence Berkeley Lab., 1975. (Year: 1975).*

Steinhauer, Loren C. "Review of field-reversed configurations." Physics of Plasmas 18.7 (2011): 070501. <https://www.researchgate.net/profile/L_Steinhauer/publication/234887285_Review_of_field-reversed_configurations/links/5948480da6fdcc70635a28df/Review-of-field-reversed-configurations.pdf>.*

Farley, D. R., et al. "Modeling of hydrogen ground state rotational and vibrational temperatures in kinetic plasmas." Journal of Quantitative Spectroscopy and Radiative Transfer 112.5 (2011): 800-819. <https://www.sciencedirect.com/science/article/pii/S0022407310004012.>.*

Cohen, S., et al. "RF Plasma Heating in the PFRC-2 Device: Motivation, Goals and Methods." AIP Conference Proceedings. vol. 1406. No. 1. AIP, 2011. <https://aip.scitation.org/doi/abs/10.1063/1.3664976>.*

Marcus, F. B., et al. "JET experiments with 120 keV 3He and 4He neutral beam injection and neutron diagnostic applications." Plasma physics and controlled fusion 34.8 (1992): 1371. (Year: 1992).*

Office Action dated Aug. 29, 2017 from U.S. Appl. No. 14/466,425 15 pages.

Craig H. Williams et al. Realizing "2001: A Space Odyssey": Piloted Spherical Torus Nuclear Fusion Propulsion Mar. 2005, NASA/TM-2005-213559, AIAA-2001-3805; 50 pages.

\* cited by examiner

FUELING METHOD FOR SMALL, STEADY-STATE, ANEUTRONIC FRC FUSION REACTORS

CROSS REFERENCE TO RELATED APPLICATIONS

This application claims the benefit of U.S. Provisional Patent Application Ser. No. 61/873,651, filed on Sep. 4, 2013. This application is a continuation-in-part of PCT/US2013/40520, filed May 10, 2013, which claims the benefit of U.S. Provisional Application Ser. No. 61/645,459, filed May 10, 2012, and U.S. patent application Ser. No. 14/466,425, filed Aug. 22, 2014, which claims the benefit of U.S. Provisional Application Serial No. 61/868,629, filed Aug. 22, 2013. The contents of each of these applications are incorporated herein by reference.

STATEMENT REGARDING FEDERALLY SPONSORED RESEARCH OR DEVELOPMENT

This invention was made with government support under Grant #DE-AC02-09CH11466 awarded by the Department of Energy. The government has certain rights in this invention.

FIELD OF THE INVENTION

The present invention relates generally to the field of plasma physics and, in particular, to methods and apparati for introducing fuel into a plasma to facilitate nuclear fusion for the purpose of producing power.

BACKGROUND OF THE INVENTION

Many methods for introducing fuels into nuclear fusion reactors have been used including ion jets, pellet injection, and gas puffing. Ion jets are deflected out of the device along the magnetic field lines. In pellet injection, a fuel pellet enters a plasma at supersonic speeds, ablates, and penetrates 1-2 meters. In gas puffing, a fuel in gaseous form is puffed into the plasma. The gas puffing jets are relatively slow and have a high probability of being ionized in the scrape-off-layer. In both pellet injection and gas puffing, much of the fuel is lost and little control can be exerted on the timing and placement of the injected fuel.

When the fusion fuels are deuterium and tritium and the reactor is terrestrial, using extra fuel and wasting it is not a major concern. However, when using a rare fuel such as helium-3 or in a reactor located in the air or in space, fuel management becomes a key concern.

Traditionally, neutral beam injection (NBI), while it adds ions to the plasma, is used for heating large plasmas. In NBI, a large number of ions are produced and accelerated through a high-voltage field and shaped into a beam. It is then neutralized when it passes through a gas cloud, via the charge-exchange process, before being passed into a reactor's core.

Moderate energy neutral beams of the required current (about 100 mA) and energy (10-30 keV) have been reliably made for over 40 years. Earlier in fusion research, such beams were used for heating mirror plasmas and, later, beams of these energies but higher currents were used for heating tokamak plasmas and driving currents in them.

SUMMARY OF THE INVENTION

Herein a method and system are disclosed describing the use of NBI for more efficient fueling of a fusion reactor, in this case a field-reversed configuration (FRC).

Recently, NBI injection has been used for heating and stabilizing large field-reversed configuration (FRC) plasmas. Current and future NBI devices, designed for tokamak-type reactors, have NBI sources with much higher energies and currents than those needed for a Princeton Field-Reversed Configuration-type reactor (PFRC).

Neutral beam injection for heating a plasma in an FRC has previously been described in Hartman et al. (U.S. Pat. No. 4,314,879, 1979). The FRC described there crucially differs from the current system in many ways. First, the primary claim thereof is the confinement of "gun"-produced FRC's between magnetic mirror coils and not fueling. Secondly, deuterium and tritium are the envisioned fuels, which changes the requirements and method of fueling, as discussed above. Finally and most importantly, while Hartman et al. state that the plasma is "sustained by energetic neutral particle beams", this is clarified in the caption of Table 3, where the plasma ring is described as being heated by the neutral beam and not fueled. This can also be seen from the fact that their neutral beam requires 7.2 MW of power for heating, whereas the neutral beam of the current system only needs 650 W for refueling, a difference on the scale of four orders of magnitude. Hartman and his co-author's disregard for fuel waste is clear from their choice of a pulse plasma device, where fuel burn-up occurs at a rate of 1% per second.

A more recent application of NBI in FRCs has been described in Rostoker et al. (U.S. Pat. No. 7,613,271, 2009), however, the current system removes the explicit requirement thereof that the neutral beam be polarized.

Hashimoto (U.S. Pat. No. 4,480,185, 1984), Knorr (U.S. Pat. No. 4,650,631, 1984), Dawson et al. (US H554, 1988) describe the use of NBI for various other types of fusion reactors. Each envisions the use of NBI for heating tokamaks burning deuterium and tritium and none use NBI for fueling purposes. The differences between tokamaks and FRC's are large, including size, geometry, and system of power generation. These all effect how a neutral beam could be used in such a system.

Sykes et al. (US20130089171, 2011) also describe using tritium as a fuel in a tokamak, in this case a spherical one, but the goal is not to produce power. Instead, the aim is to generate as many 14 MeV neutrons as possible, which is one of the very outcomes the current system is attempting to minimize, as it can lead to harmful radiation damage to the reactor's structure.

Distinct from the present invention, Sykes et al. explicitly describe the fueling system as the standard tokamak method, where "the tokamak fuelling system is designed to inject the fuelling gas or solid pellets of hydrogen, deuterium, and tritium . . . in gaseous or solid form." Instead, Sykes et al. propose using a neutral beam for plasma heating to drive the current necessary to sustain the plasma. The current invention does not propose using the neutral beam for current drive or heating. This leads to the clear difference between Sykes et al.'s required energy and power (greater than 80 keV and 5-10 MW) and that of the present invention (5 keV and less than 1 kW). Finally, the 'compact' reactor of Sykes et al. is significantly larger (e.g. sixteen times larger) than that of the current invention.

In at least one embodiment, the present invention provides a system and a method for producing and injecting a neutral beam of ions into a plasma contained in an FRC, in order to fuel a continuous fusion reaction of deuterium and helium-3. This will result in a fueling method that is less wasteful and provides finer control of fueling than described in the prior art, allowing for use of rarer fuels, such as helium-3. It also allows for the use of less fuel, a critical requirement for reactors located on aircraft and spacecraft.

The present invention provides a field-reversed configuration fusion reactor system employing neutral beam injection for fueling. In at least one embodiment, the reactor includes a chamber for containing a stable plasma of fusion fuels and a heating system for heating the plasma and increasing an ion energy of the plasma to produce fusion reactions in the stable plasma. A plurality of magnets are situated coaxial to the reactor chamber and produce a magnetic field that confines the stable plasma and promotes rapid loss of fusion products into a scrape-off-layer (SOL). A fuel injection system, employing a neutral beam injector, is included for injecting additional quantities of the fusion fuel to sustain the power output of the fusion reactions in the plasma. The neutral beam injector consists of an initial chamber to ionize the fusion fuel to form a plasma, means to continuously extract the desired ions from the plasma in a desired amount, means for focusing the extracted ions into a highly directional, narrow beam, means for accelerating the ion beam to a desired energy, means for neutralizing the ion beam using the charge-exchange process, and aiming the neutralized ion beam into the core of the plasma contained in the fusion reactor.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
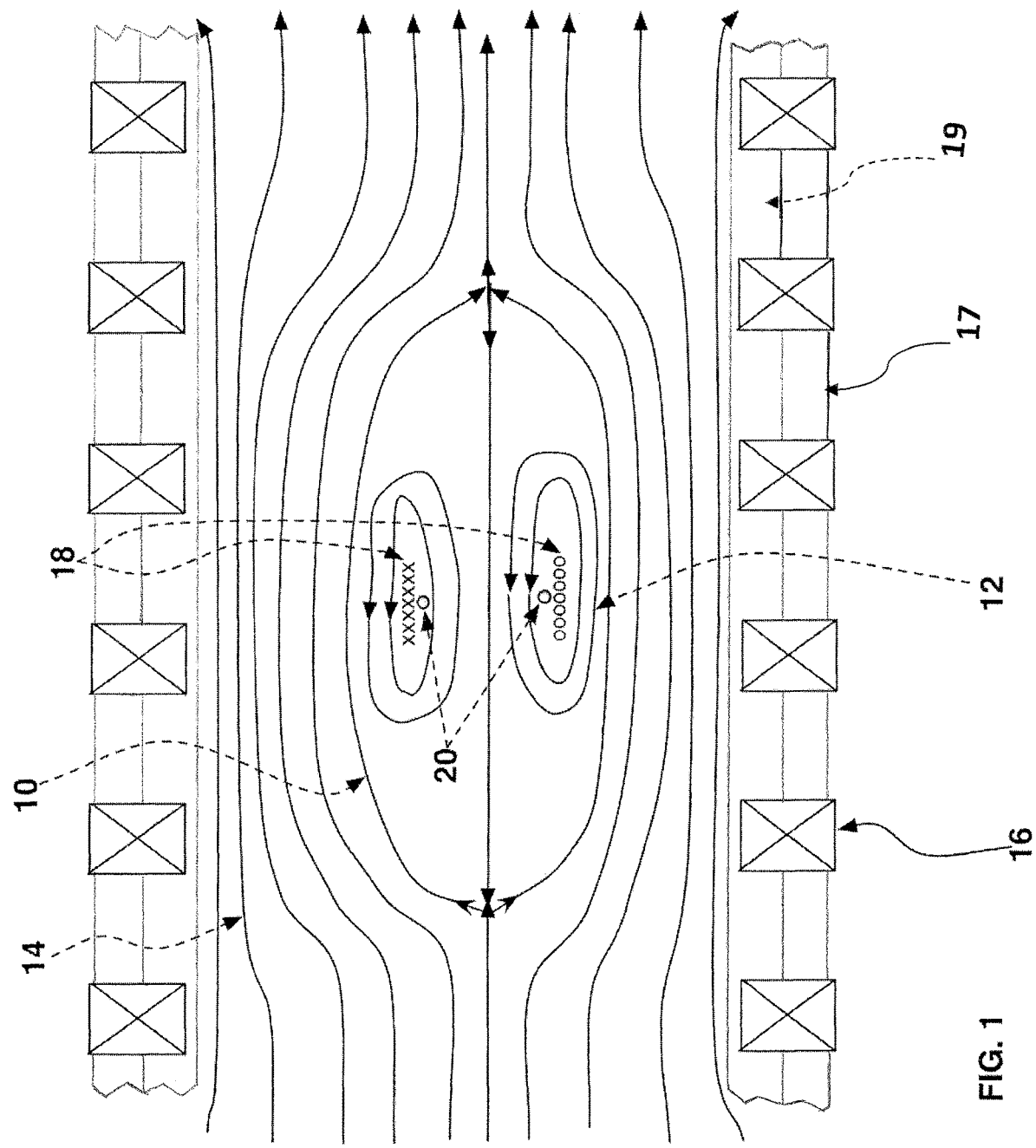
FIG. 1 shows an example magnetic field configuration for an FRC fusion reactor system in accordance with an exemplary embodiment of the invention.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the disclosed scenarios. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

During the course of this description like numbers will be used to identify like elements according to the different views, which illustrate the invention.

In nuclear fusion reactions, light nuclei bind temporarily then fragment to produce fast moving reaction products comprising heavy particles, which contain vast amounts of kinetic energy. This fusion process only occurs rapidly at temperatures of 5-500 keV (58-5,800 million K) such that the Coulomb force, which repulses the positively charged nuclei, is overcome. The reactivity (i.e. rate of fusion) is a function of the ion temperature and plasma density.

The most important fusion reactions for practical reactors are as follows:

$$D+T \rightarrow \alpha(3.6 \text{ MeV})+n(14.1 \text{ MeV}) \quad \text{(Equation 1)}$$

$$D+{}^3He \rightarrow {}^4He(3.7 \text{ MeV})+p(14.7 \text{ MeV}) \quad \text{(Equation 2)}$$

$$D+D \rightarrow {}^3He(0.8 \text{ MeV})+n(2.5 \text{ MeV}) \quad \text{(Equation 3)}$$

where D is deuterium, T is tritium, $\alpha$ is a helium nucleus, n is a neutron, p is a proton, and $^3$He and $^4$He are helium-3 and helium-4, respectively. The associated kinetic energy of each product is indicated in parentheses.

The D-T reaction produces most of its energy in neutrons, which means that electrical energy can only be produced by using the neutron radiation to heat a working fluid, much like in a conventional boiler or a fission reactor. Due to temperature limitations of the working fluid, that conversion can only be about 30% efficient. An advantage of the D-T fuel mixture is that it produces net power at the lowest ion temperatures, of only 5-10 keV (1 keV=11.6 million K, and is a more convenient unit of temperature). However, the energetic neutrons liberated in this reaction represent a significant threat to the reactor's structure as the neutron flux degrades the electrical, mechanical, and thermal properties of the reactor components and also leaves many of their materials radioactive. For terrestrial power reactors, most of these energetic neutrons are used to breed tritium, a scarce material. Thus, the D-T fuel mixture poses significant challenges with radiation damage, material activation, and fuel availability. Pursuing a D-T reactor would require substantial research and development of nuclear materials and tritium breeding as well as several meters worth of shielding to protect reactor components and personnel from neutron radiation.

The D-D fusion reactions are very attractive because the abundance of deuterium obviates the need to breed tritium. Moreover, the neutrons generated are fewer in number and lower in energy than from D-T per unit of energy produced. By selective treatment of D-D fusion's daughter products—removing the T from the plasma before it fuses but burning the prompt and decay-formed $^3$He, a technique called He-catalyzed D-D fusion—the neutron production can be reduced to 10% of the D-T level, per unit of energy produced.

The D-$^3$He reaction is termed aneutronic, because it directly produces relatively few neutrons and requires none for breeding. The energy from the charged reaction products may be directly converted to electrical power at a much higher efficiency than D-T. However, higher ion energies or temperatures, of 50-100 keV, are required to achieve the same reactivity as D-T. Both D-D and D-$^3$He reactions admit D-D side reactions, which for a D-$^3$He reactor is the only source of neutron production. A known method for decreasing this neutron generation is lowering the reactant concentration ratio of D-$^3$He, for example, from 1:1 to 1:9. In a thermal plasma with 100 keV ion temperatures and T ash promptly removed, neutron production drops from 2.6% to 0.5% of D-T's per unit of energy produced. This reduces the level of neutron shielding required to well under a meter. However, the lower D concentration reduces the power density by a factor of 4.5, adversely affecting the economics. A method for suppressing this neutron generation pathway was been presented in International Patent Application Serial No. PCT/US13/33767 which is incorporated by reference as if fully disclosed herein.

Among all fusion fuels, D-$^3$He is preferred for the applications described in this disclosure because it produces fewer neutrons while generating net power.

The plasma is formed within a reactor chamber, which may be small enough to accommodate ion gyroradii that are about 1/10th of the plasma radius and mostly have axis encircling orbits. This promotes the plasma stability against the tilt mode. A heating system, such as radio frequency generating magnetic coils, must be able to raise the plasma's ion energy such that fusion reactions occur. As one example, locating multiple discrete magnets coaxially to the reactor chamber, a corrugated axial magnetic field is formed that also mediates against the unstable tilt mode.

The magnetic confinement scheme can employ either permanent magnets or magnetic coils. The magnets control the size of the plasma so that it is large enough to contain fusing plasma of sufficient power while small enough to be effectively heated and allow the fusion products to quickly move into a scrape-off-layer (SOL). The SOL is a typical component of magnetic confinement fusion devices with internal closed field lines and is crucial for this system of thrust augmentation. It is found in tokamaks, stellarators, reversed-field pinches, spheromaks, and field-reversed configurations (FRCs).

In order to sustain conditions in the reactor's core, the fusion fuel should be injected at a rate such that it is replenished as it is depleted. In order for the injection scheme to be successful, most of the injected propellant should pass through the lower density, cooler SOL without being ionized. The reactants should then be ionized and contained in the hot, dense core.

An exemplary FRC, depicted in FIG. 1, forms a quasi-toroidal, closed-field, simply connected magnetic confinement device with open field lines exiting the reactor chamber approximately paraxially. A separatrix 10 divides the closed-field region 12 from the open-field region 14, with the latter containing the SOL. The discrete flux conserving magnetic coils 16 provide magnetic pressure while allowing the heating method, such as an odd-parity (i.e. anti-parallel) rotating magnetic field (RMF$_o$) from external radio frequency magnetic coils, to penetrate the plasma. A toroidal current 18, centered on the O-point null line 20, is formed around the axis of the closed-field region 12. The surface-to-volume ratio of the FRC is large, reducing the neutron power-load density on the reactor chamber walls of a vacuum vessel 17 and component degradation. However, some radiation from will occur and may be absorbed by a shield 19.

Figure 2:
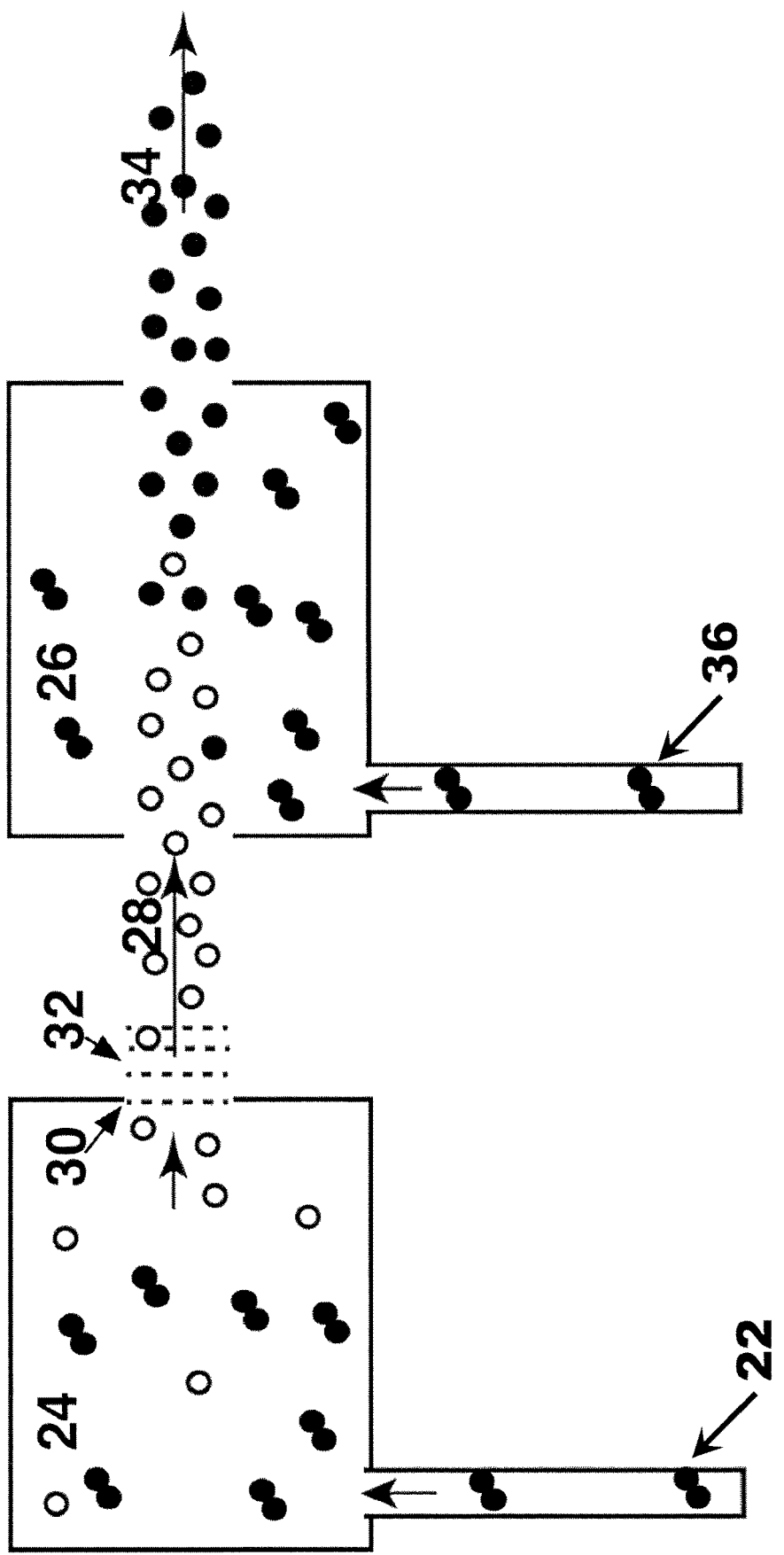
FIG. 2 shows an example configuration for a neutral beam injection system in accordance with an exemplary embodiment of the invention.

FIG. 2 depicts an exemplary system configuration for neutral beam injection, which is used to feed a tight beam of energetic neutral D and $^3$He into the center of the reactor chamber. The neutral beam is created by injecting a feedstock gas propellant 22, in this case helium-3 or deuterium, into a plasma formation box 24 and charge exchange box 26. In the plasma formation box 24, the feedstock gas propellant 22 is weakly ionized. The ionized ions are ejected through an ion extraction grid 30 and then accelerated through a high-voltage ion acceleration grid 32 to form an ion beam 28. The energy of the beam is determined by the magnitude of the voltage. The ion beam 28 then enters the charge exchange box 26 where electrons are passed from a neutralizing gas 36, such as argon, to the ion beam, thereby neutralizing it and forming the neutral beam 34. The neutral beam 34 is then injected into the reaction chamber.

Not wasting fuel, especially helium-3 which is rare and expensive, is the primary constraint on the fueling method. There are three stages in the method of particular concern: when the ion beam is neutralized via charge exchange with another gas, when the neutral beam penetrates the SOL, and ionization of the neutral beam when it reaches the core.

Calculations based on charge-exchange data show that losses are minimal for many gases when there are relatively low beam energies. If argon is used as the neutralizing gas with a 20 keV, then over 97% of the ion beam can be converted into a neutral beam.

Neutral beam penetration is more successful in the SOL for both fuels as the SOL's density decreases at higher temperatures. This effect is much more dramatic for deuterium, where less than 10% of the beam penetrates the SOL when the latter is cooler than approximately 100 eV. This is in stark contrast with helium-3 which would have a 50% penetration rate. Furthermore, the deuterium neutral beam penetration through the SOL is highly dependent on beam energy, suggesting that the deuterium neutral beam should have energies above that of the helium-3 neutral beam.

The neutral beam, after passing through the SOL, is ionized and thus magnetically confined in the core of the device. The core's much greater density and thickness aids in this objective. Simulations for a 20 keV deuterium neutral beam, with a SOL temperature of 600 eV and electron density of 2e13 particles per cc, show that 86% of the neutral deuterium beam will be deposited in the core, under 0.01% will be transmitted through the entire device and strike the opposite wall of the reactor chamber, and the remaining ~20% will be ionized and lost in the SOL. Likewise, 96% of a 20 keV helium-3 neutral beam is deposited in the core.

Although the scenarios herein have been described with reference to particular embodiments, it is to be understood that these embodiments are merely illustrative of the principles and applications of the disclosed scenarios. It is therefore to be understood that numerous modifications may be made to the illustrative embodiments and that other arrangements may be devised without departing from the spirit and scope of the disclosed scenarios as defined by the appended claims.

What is claimed is:

1. A field reversed configuration (FRC) fusion reactor system comprising:
    a plasma formation box configured to receive a fusion fuel and ionize the fusion fuel to form a source plasma of fuel ions;
    a reactor chamber configured to receive a neutral beam and maintain a stable plasma, wherein the plasma formation box is a separate chamber from the reactor chamber;
    an ion extraction grid configured to form an ion beam by continuously extracting a plurality of fuel ions from the source plasma;
    an ion acceleration grid configured to form an accelerated ion beam by accelerating the ion beam as the ion beam passes through an electric field of the acceleration grid; and
    a charge exchange box;
    a heating system configured to heat the stable plasma and increase an ion energy of the stable plasma to 5 kiloelectronvolts in order to produce a power output from fusion reactions in the stable plasma;
    a plurality of magnets coaxial to the reactor chamber, wherein the plurality of magnets produce a magnetic field sufficient to confine the stable plasma and promote rapid loss of fusion products into a scrape off layer, wherein the plurality of magnets in conjunction with the stable plasma produces a magnetic field in a field-reversed configuration, wherein the charge exchange box is configured to:
form the neutral beam having a power of less than 1 kW by interacting the accelerated ion beam with a neutralizing gas, and
focus the neutral beam at a fusion core in the reactor chamber.

2. The FRC fusion reactor system of claim 1, wherein the plasma formation box is configured to receive the fusion fuel that comprises deuterium and helium-3.

3. The FRC fusion reactor system of claim 1, wherein the magnets are superconducting magnetic coils.

4. The FRC fusion reactor system of claim 1, wherein the magnets are permanent magnets.

5. The FRC fusion reactor system of claim 1, wherein the neutralizing gas is argon.

6. The FRC fusion reactor system of claim 1, wherein the heating system employs radio frequency odd-parity rotating magnetic fields produced by radio frequency magnetic coils.

7. The FRC fusion reactor system of claim 1, wherein said reactor chamber is a vacuum vessel which is transparent to radio frequencies.

8. The system of claim 1, wherein the plasma formation box is configured to receive the fusion fuel that is helium-3.

9. The system of claim 1, wherein the energy of the neutral beam is in a range of 10 to 30 kiloelectronvolts.

10. The system of claim 9, wherein the energy of the neutral beam is 20 kiloeletronvolts.

11. A method for fueling a field-reversed configuration (FRC) fusion reactor that includes a reactor chamber containing a stable plasma comprising a fusion fuel, a plurality of magnets coaxial to the chamber, a heating system, and a neutral beam injection system, the method comprising:
using the FRC reactor system of claim 1 for injecting, by a fuel injection system, the fusion fuel into the reactor chamber;
heating, by the heating system, the plasma such that the fuel is ionized and heated to at least 5 kiloelectronvolts to produce power from a sustained nuclear fusion reactions, occurs in the plasma;
forming, by the plurality of magnets, a magnetic field to confine the plasma and promote rapid loss of fusion products into a scrape-off-layer, wherein said plurality of magnets in conjunction with said stable plasma produces a magnetic field in a field-reversed configuration;
injecting the fusion fuel into a plasma formation box;
ionizing the fusion fuel in the plasma formation box whereby a plasma source is formed;
extracting a plurality of desired fuel ions, by an ion extraction grid, from the plasma source, wherein the fuel ions that are extracted form an ion beam;
accelerating, by an ion acceleration grid, the ion beam through a potential gradient of an electric field, wherein energy of the ion beam that is accelerated is function of said potential gradient;
directing the ion beam that is accelerated into a charge exchange box;
injecting a neutralizing gas into the charge exchange box and neutralizing the ion beam that is accelerated, whereby a neutral beam is formed; and
injecting the neutral beam toward a core of the plasma located in said reactor chamber, such that fuel is provided for fusion reactions.

12. The method according to claim 11, wherein said fusion fuel comprises deuterium and helium-3.

13. The method according to claim 11, wherein the plurality of magnets are superconducting magnetic coils.

14. The method according to claim 11, wherein the plurality of magnets are permanent magnets.

15. The method of claim 11, wherein the neutralizing gas is argon.

16. The method of claim 11, wherein the heating system employs radio frequency odd-parity rotating magnetic fields produced by radio frequency magnetic coils.

17. The method of claim 11, further comprising attenuating and deflecting radiation produced from the fusion reactions.

18. The method of claim 11, wherein said reactor chamber is a vacuum vessel which is transparent to radio frequencies.

19. The method of claim 11, wherein the fusion fuel is helium-3.

20. The method of claim 11, wherein energy of the neutral beam is in a range of 10 to 30 kiloelectronvolts.

* * * * *